Dennison & Gould.
Pumps for Fire Engines.
Nº 71287.   Patented Nov. 26, 1867.
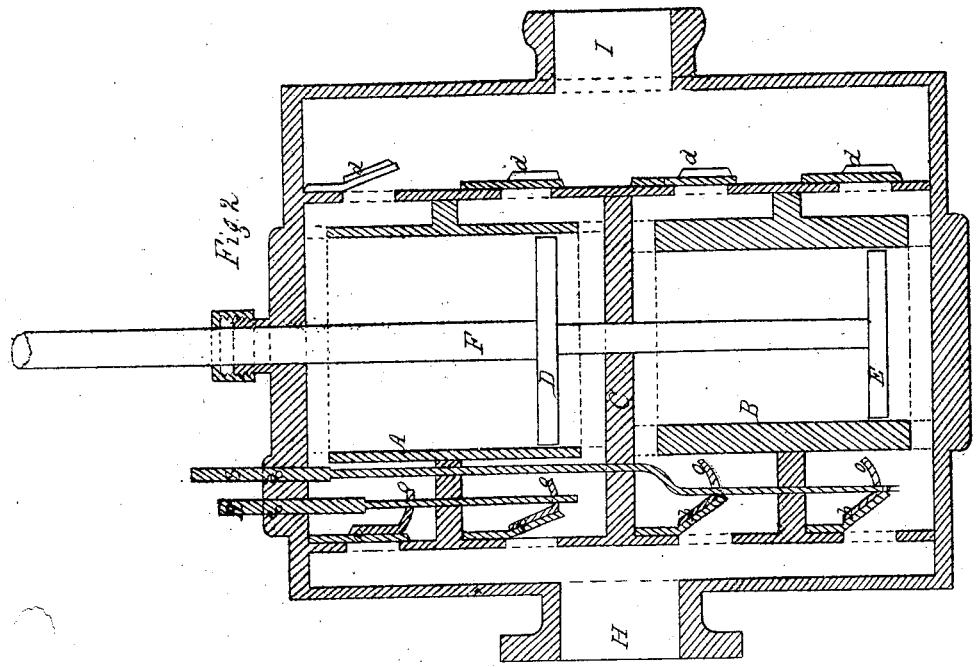
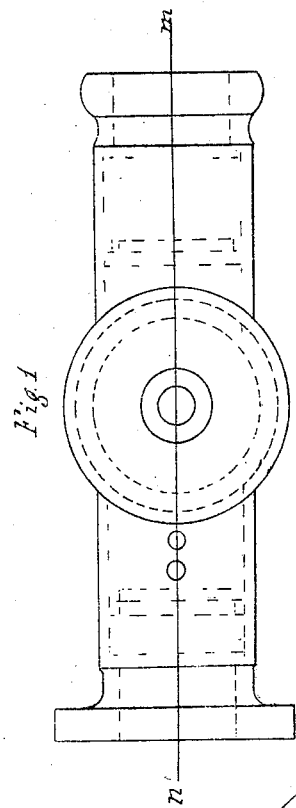
Witnesses　　　　　　　　　　　　Inventors

United States Patent Office.

JOHN N. DENNISSON AND ROSCOE J. GOULD, OF NEWARK, NEW JERSEY.

Letters Patent No. 71,287, dated November 26, 1867.

IMPROVEMENTS IN PUMPS FOR FIRE-ENGINES.

*The Schedule referred to in these Letters Patent and making part of the same.*

TO ALL WHOM IT MAY CONCERN:

Be it known that we, JOHN N. DENNISSON and ROSCOE J. GOULD, of the city of Newark, in the county of Essex, and State of New Jersey, have invented a new and useful Improvement in Pumps for Steam Fire-Engines; and we do hereby declare that the following is a full, clear, and exact description of the construction and operation of the same, reference being had to the annexed drawing, making a part of this specification.

Figure 1 represents a plan of the pumps.

Figure 2 is a transverse vertical section through $m\,n$, fig. 1, showing two pumps in line with each other, and separated by a partition, their pistons being upon one and the same rod.

The object of this invention is the same as that described in Letters Patent of JOHN N. DENNISSON, February 7, 1865, October 23, 1866, and April 24, 1866, viz, combine to pump-cylinders so that they can be coupled or uncoupled by a simple mechanism, and that the quantity of water thrown can be regulated.

The construction is as follows: A B are pump-cylinders of different diameters, separated from each other by the partition C. D and E are the pistons, F the piston-rod, connected to and operating both pistons, H the receiving or suction-pipe, I the discharge-pipe. $a\,a\,b\,b$ are receiving or suction-valves. $d\,d\,d\,d$ are discharge-valves. R and S are rods or levers, by which the valves are operated upon, and may be attached to either the suction or discharge-valves. $o\,o\,o\,o$ are arms or hooks on valves $a\,a\,b\,b$, by which they are connected to rods R and S, and should be so arranged that when the rods are in the position as shown by R $a\,a$, the valves can open and close freely, but as shown by S $b\,b$, the valves are held open. E E are pins for fastening rods R S, or they may be held in position by any convenient fastening.

The operation is as follows: When the situation is such that a large quantity of water is wanted, and it is required to draw and force it but a short distance, the rods R S being placed in position that the valves $a\,a\,b\,b$ can move freely, both pumps may be worked; but when it is required to force the water to a great distance, let the rod S be drawn up so as to open the valves $b\,b$, as shown in the figure, and as the pistons move, the water in cylinder B passes round through the valves $b\,b$ from one side of the piston to the other, or, in other words, the small pump simply stops working or throwing water, thus allowing the force of the engine to be applied to the large pump, and when it is required to force the water to a still greater distance, the rods S may be dropped down, and rod R drawn up so as to allow valves $b\,b$ to operate, while valves $a\,a$ are held open, thus stopping the large pump, or preventing it from throwing water, and allowing the whole power of the engine to be applied to the small pump.

It will here be seen that we accomplish nearly the same result as is accomplished in the patent granted to JOHN N. DENNISSON April 24, 1866. In that a separate passage and stop-cock are used; in this the receiving or discharge-valves, and the passage through them to the piston, are made by a movement given to the valves by rods R and S and $o\,o\,o\,o$, to serve a similar purpose. By forcing down rod S upon arms $o\,o$, we may close valves $b\,b$ so as not to admit water into cylinder B; it will then be seen that piston E can throw no water, and thus the small pump B E stops working. Also with rod R we may close tightly valves $a\,a$, and stop the action of the large pump A D, and thus it will be seen that we may control the action of the pump by opening the receiving or discharge-valves, or by closing the receiving-valve.

It will be seen that we accomplish the desired object of governing the amount of water thrown, in different ways, by the same means or device. In applying our improvement to different-formed pumps or valves, it will be necessary to alter the form and position of the rods R and S.

What we claim as new, and desire to secure by Letters Patent, is—

The arrangement of rods R S, in combination with the receiving or discharging-valves of a pump, substantially as and for the purpose described.

J. N. DENNISSON,
ROSCOE J. GOULD.

Witnesses:
M. E. CAMPFIELD,
C. H. CANFIELD,